United States Patent [19]

Manzke et al.

[11] Patent Number: 5,366,788
[45] Date of Patent: Nov. 22, 1994

[54] COMPACT CASSETTE HAVING A LINER MADE OF HIGH GLASS-TRANSITION-TEMPERATURE POLYMER MATERIALS

[75] Inventors: Klaus Manzke, Westheim; Juergen Ahlers, Gross-Rohrheim, both of Germany

[73] Assignee: BASF Magnetics GmbH, Mannheim, Germany

[21] Appl. No.: 153,891

[22] Filed: Nov. 17, 1993

Related U.S. Application Data

[63] Continuation of Ser. No. 868,901, Apr. 16, 1992, abandoned, which is a continuation of Ser. No. 494,549, Mar. 16, 1990, abandoned.

[30] Foreign Application Priority Data

Mar. 28, 1989 [DE] Germany .................. 8903787[U]

[51] Int. Cl.$^5$ ........................................... G11B 23/087
[52] U.S. Cl. ............................ 428/174; 428/900; 428/694 R; 428/176; 428/181; 428/412; 206/387; 206/389; 360/132; 360/133; 360/134
[58] Field of Search ............. 428/174, 400, 694 R, 428/176, 181, 412; 206/387, 389; 242/199, 200; 360/132, 133, 134

[56] References Cited

U.S. PATENT DOCUMENTS

| | | | |
|---|---|---|---|
| 3,620,480 | 11/1971 | Knox | 242/199 |
| 3,791,608 | 9/1973 | Akashi et al. | 242/199 |
| 3,977,626 | 8/1976 | Gaiser et al. | 242/199 |
| 4,102,515 | 7/1978 | Milants | 242/199 |
| 4,119,282 | 10/1978 | Oishi | 242/199 |
| 4,127,242 | 11/1978 | Hashimoto et al. | 242/199 |
| 4,376,519 | 3/1983 | Ishida et al. | 242/199 |
| 4,411,943 | 10/1983 | Akao | 428/161 |
| 4,411,945 | 10/1983 | Akao | 428/141 |
| 4,477,531 | 10/1984 | Kohler et al. | 428/900 |
| 4,621,779 | 11/1986 | Fitterer et al. | 242/199 |
| 4,632,334 | 12/1986 | Schaeffer et al. | 242/199 |
| 4,743,487 | 5/1988 | Saito et al. | 428/900 |
| 4,780,353 | 10/1988 | Takahashi et al. | 428/900 |
| 4,910,068 | 3/1990 | Takagi et al. | 428/141 |

FOREIGN PATENT DOCUMENTS 0277301  8/1988  European Pat. Off. ........... 428/141

*Primary Examiner*—William Watkins, III
*Attorney, Agent, or Firm*—Keil & Weinkauf

[57] ABSTRACT

A compact cassette is provided with substantially rectangular plastic support liner(s) between tape roll(s) and cassette wall(s), having at least one longitudinal bend, and the deflections of the support liners in a defined load range should be not more than a factor of 2 greater in the case of exposure to heat at about 85° C. compared with no exposure. Suitable liner materials are those having glass transition temperatures equal to or greater than 85° C., for example consisting of polysulfones, polyethersulfones, polyarylether ketones, polyetherimides, and/or blends and/or copolymers thereof.

13 Claims, 3 Drawing Sheets

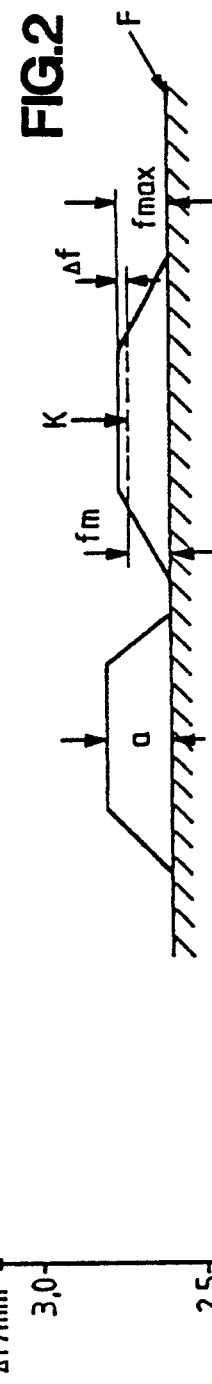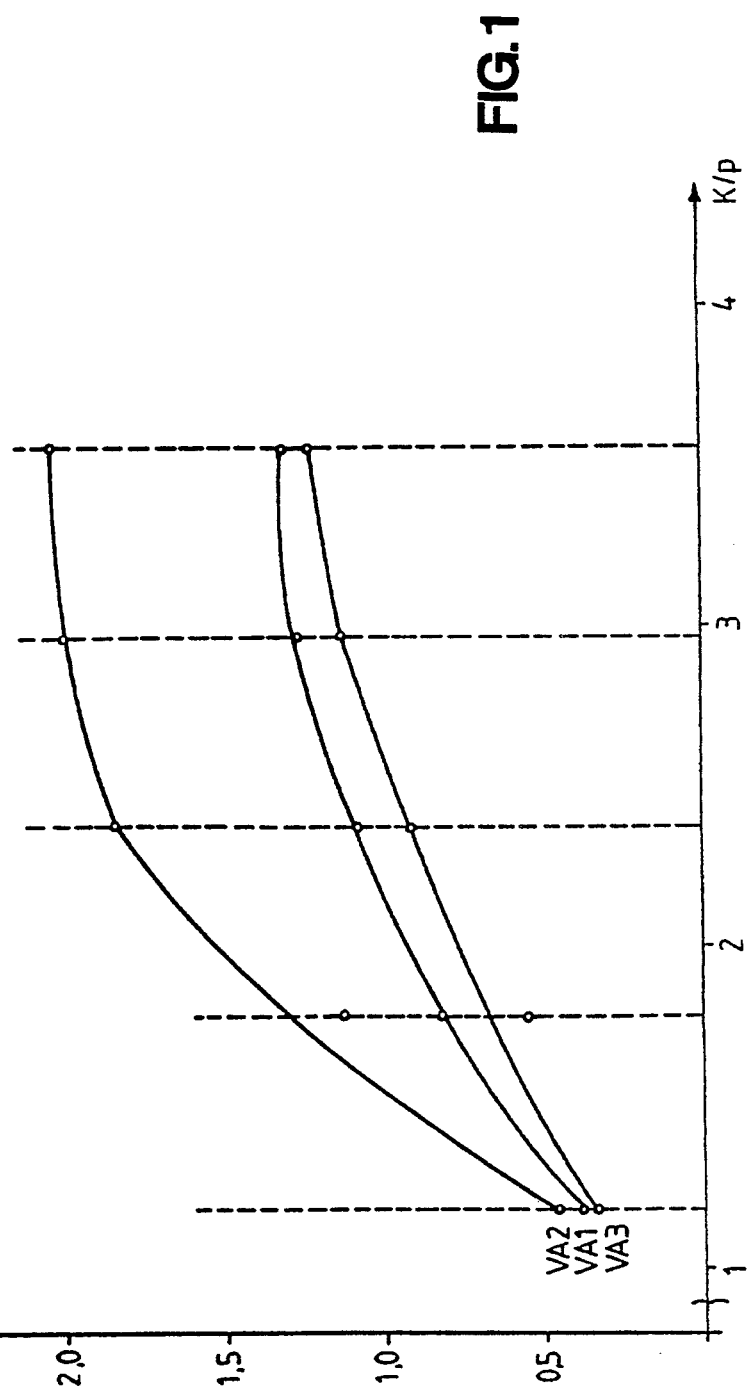
FIG.1
FIG.2

COMPACT CASSETTE HAVING A LINER MADE OF HIGH GLASS-TRANSITION-TEMPERATURE POLYMER MATERIALS

This application is a continuation of application Ser. No. 07/868,901, now abandoned, filed on Apr. 16, 1992 which is a continuation-in-part of Ser. No. 07/494,549, filed on Mar. 16, 1990, now abandoned.

BACKGROUND OF THE INVENTION

1. Field of the Invention

The present invention relates to a compact cassette having at least one substantially rectangular plastic support liner which is arranged above and/or below the tape rolls and essentially covers these over their area and which has at least one longitudinal bend for elastic support of the tape rolls, and a support liner for this cassette.

2. Description of the Related Art

It is known that, in compact cassettes (corresponding to DIN 45,516), support liners can be used as means for improving the roll support and the friction properties during rewind and playback. These liners can be provided with bends and beads for roll support and for reducing the contact areas.

As a rule, these support liners consist of (aliphatic, nonaromatic) polyester material, or more precisely of polyethylene terephthalate having low heat stability.

OBJECTS AND SUMMARY OF THE INVENTION

It is an object of the present invention to provide a compact cassette and support liners for this cassette, which, in the form of a liner having a longitudinal bend, continue to function even after storage at a temperature of about 85° C. in particular under the long-term influence of a temperature of about 85° C.

We have found that this object is achieved by a compact cassette having at least one substantially rectangular plastic support liner which is arranged above and/or below the tape rolls and essentially covers these over their area and which has at least one longitudinal bend for elastic support of the tape rolls, wherein the elastic deflections of the liner, based on the deflections of 50 μm thick liner, under a load of from about 1.5 to about 3.6 p[1], where the deflection of a liner that has been exposed to a temperature of about 85° C. (deflection $\Delta f_N$) is no more than double the deflection of a liner that has not been exposed to a temperature as high as about 85° C. (deflection $\Delta f_V$), i.e. $\Delta f_N$: $\Delta f_V \leq 2$.

[1] 1 p (pond) ~ 1 cN (centiNewton)

As a result, the compact cassettes remain fully operational in respect of the support liners contained therein, particularly in motor vehicles and also in other areas involving temporary or longterm exposure to high temperatures.

BRIEF DESCRIPTION OF THE DRAWINGS

FIG. 1 shows the bend forms schematically.
FIG. 2 shows a graph of tests of polyester liners.

DESCRIPTION OF THE PREFERRED EMBODIMENTS

Figure 3:
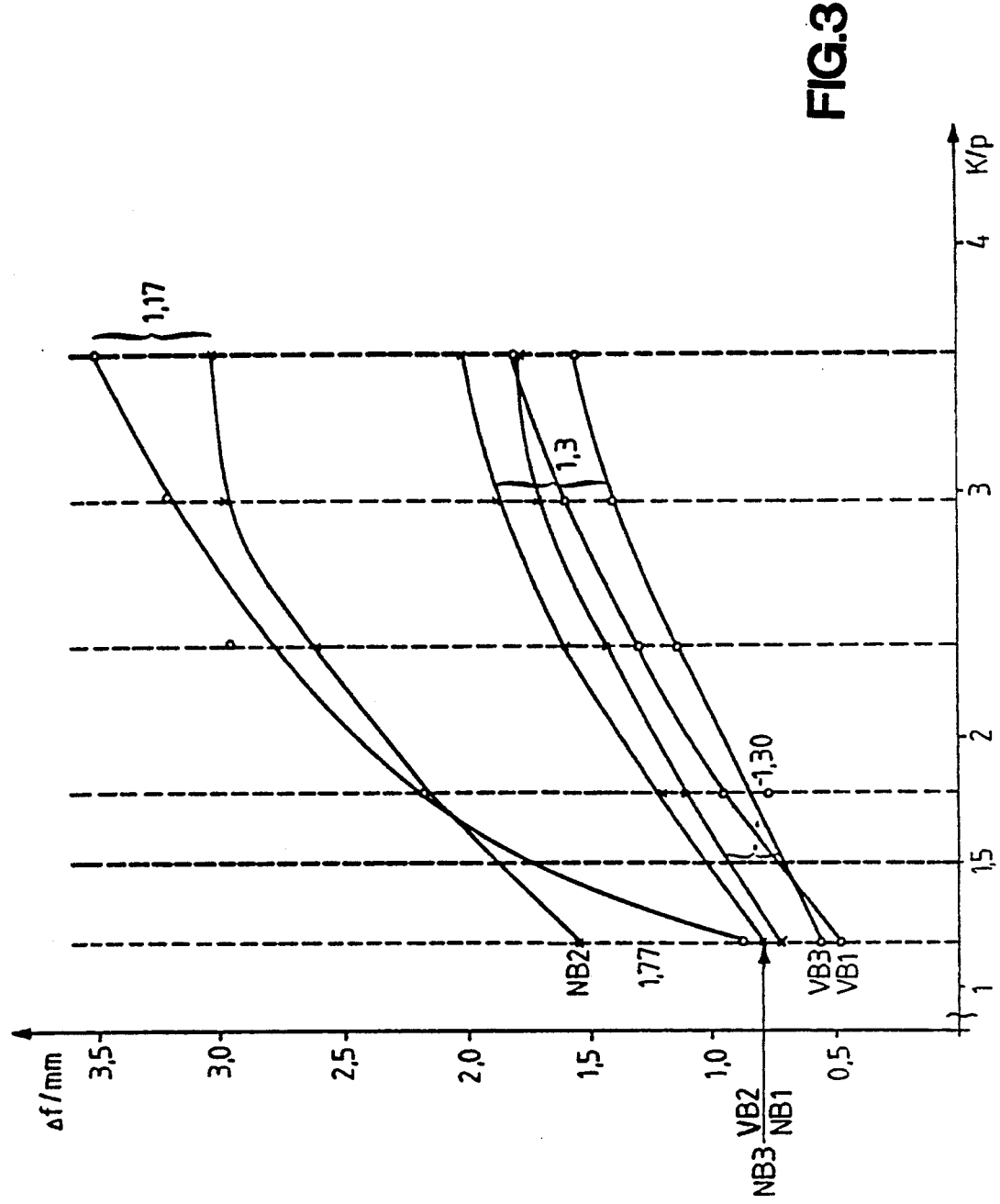
FIG. 3 shows a graph of tests of polycarbonate liners.

The present invention also relates to a support liner itself having the properties according to the invention, and said liner may advantageously be transparent.

In further mechanical embodiments, the compact cassette may be provided with liners having a central longitudinal bend or may have two or more longitudinal bends parallel to the central longitudinal axis. The liner may furthermore have one or two transverse bends.

The liner should consist of a plastic material having a glass transition temperature of not less than 85° C. The novel support liner can be produced from such a plastic material without difficulties and, with appropriate further selection of material, the loss of elasticity can be even further reduced. Specifically, the liner material may consist of a polyethersulfone or of a polysulfone, both of which have a high glass transition temperature of $TG \geq 170°$ C. and are therefore very suitable for compact cassettes resistant to high temperatures.

However, it is also possible to use blends or copolymers of polyethersulfones and polysulfones with the same advantages. It is also advantageous to use a polyetherimide as the liner material. Polycarbonate films, which are usually used for electrical insulation purposes and have a glass transition temperature of 150° C., for example Makrofol® (registered trade mark of Bayer Aktiengesellschaft, Leverkusen, Germany), can also be used.

A polyarylether ketone film whose glass transition temperature is about 170° C. can also advantageously be used for the novel cassette and/or support liners.

Where they can be chemically prepared, mixed forms and/or copolymers of the claimed materials may also be used, as well as all other film materials which have not been listed here but are suitable for the purposes of the present invention.

ILLUSTRATIVE EXAMPLES

Support liners having different longitudinal and transverse bends were produced, i.e. the bends were produced by cold forming and had the following forms:
1. 1 central longitudinal bend
2. 2 parallel longitudinal bends about 1.5 cm apart
3. 1 central longitudinal bend and two transverse bends symmetric with respect to the central transverse axis and about 3 cm apart.

In the stress-free state, a base height of about 7 mm was measured for all embodiments (1) to (3).

All films had the same thickness of 50 μm (micrometers), and the same contour and surface area before production of the bends.

From the materials stated about and in the claims, the following were selected:
(A) Polyester (polyethylene terephthalate) (for comparison purposes only)
(B) Polycarbonate
(C) Polysulfone (Ultrason® S from BASF Aktiengesellschaft, Ludwigshafen, Germany)
   The glass transition temperature TG is 185° C.
   There is also an Ultrason® E from BASF aktiengesellschaft which chemically is a polyethersulfone and has a glass transition temperature TG of 210° C.

®Registered trademark of BASF Aktiengesellschaft.

The stated plastics polysulfone, polyethersulfone and polyetherimide may be represented schematically by the following structures:

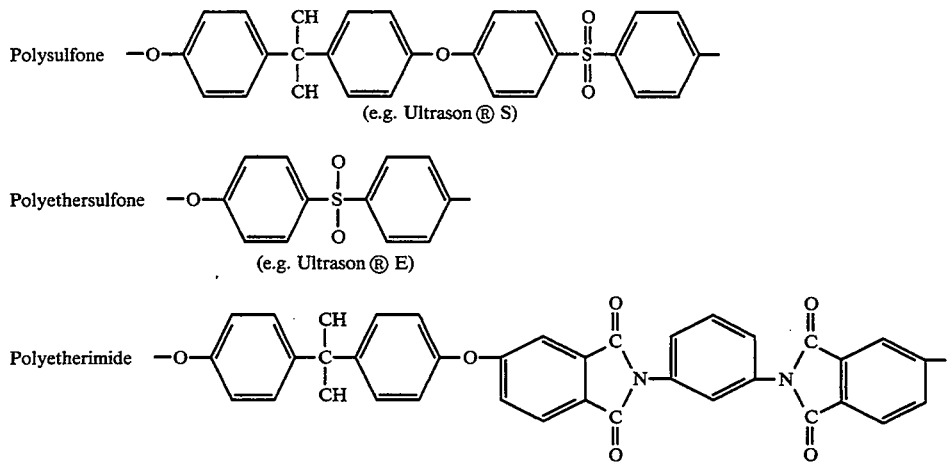

5 films of each material A–C and with each bend from (1)–(3) were subjected to loads of from 1.2 p to 3.6 p in succession using weights, before long-term exposure to heat (as will be described below) and after this exposure, and the height "a" from the load surface f to the bend was measured in mm. The 5 values for a film material having a certain bend form were averaged and the difference $\Delta f$ between this value (fm) and the height fmax of the film from which the load had been removed was calculated: $fmax - fm = \Delta f$.

Figure 4:
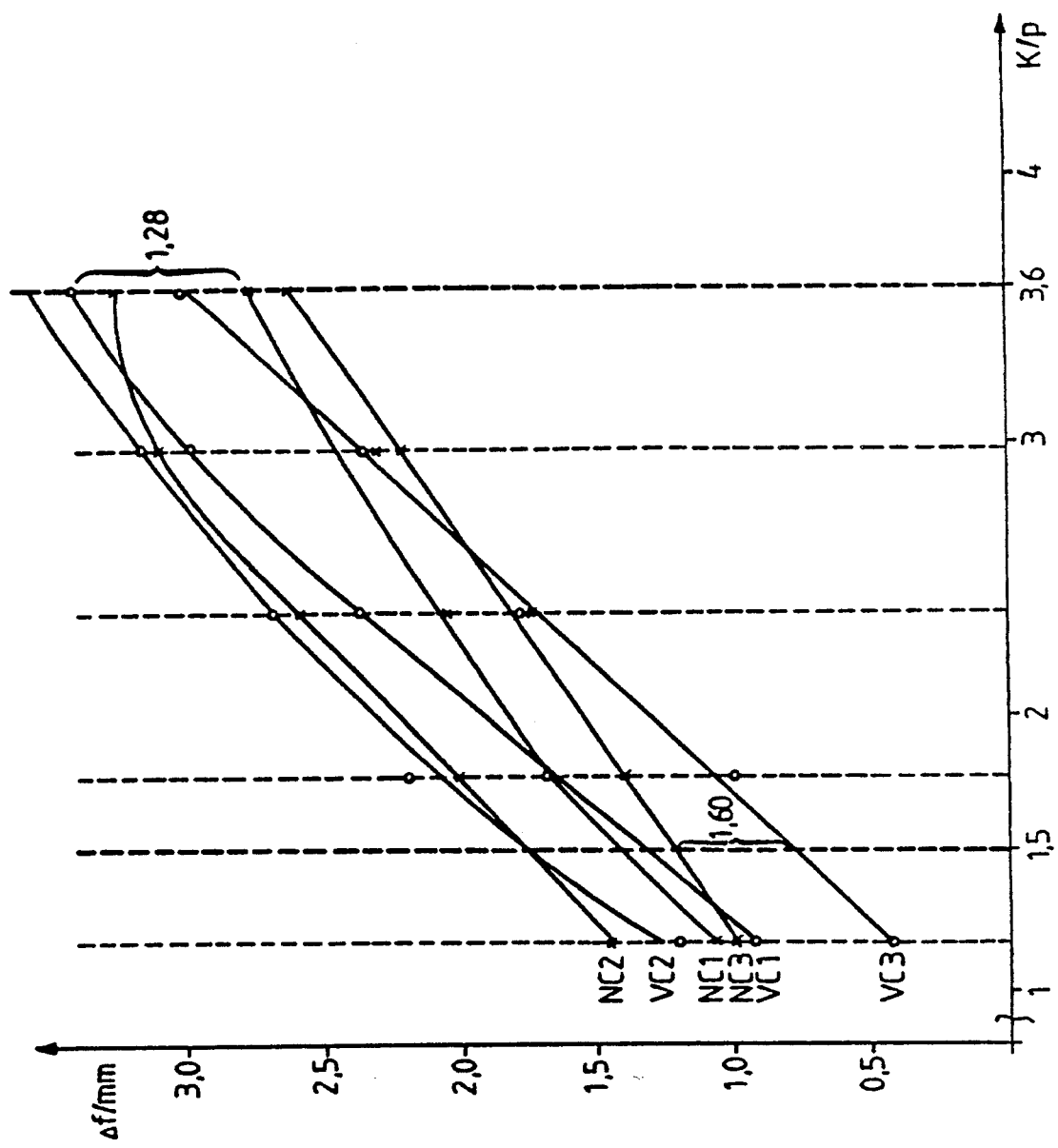
FIG. 4 shows a graph of tests of polysulfone liners.

The bend forms are shown schematically in the drawing, and the results of the measurements are plotted as spring characteristics in the graphs of FIGS. 2 to 4.

Long-Term Exposure to Heat

The process of heat exposure consists of the following sequence of steps to which the cassettes and liners are subjected, and is based on the Ford test for compact cassettes, which originates from the United States of America:

Starting temperature 23° C. and uncontrolled humidity, on average 50% humidity.
Heating of the cassettes to 85° C. in the course of 1.5 hours.
Storage of the cassettes at 85° C. for 8 hours.
Cooling of the cassettes to 23° C. in the course of 1.5 hours.
Residence time of 2 hours at 23° C.
Then carrying out the measurements.

During storage at high temperatures, the cassettes stand vertically on the front of the cassette housing on a perforated metal sheet in an oven, so that the two support liners contained in the cassette are treated completely identically.

DESCRIPTION OF THE DRAWINGS

Graphs of FIGS. 2 to 4 show the spring characteristics (K/$\Delta f$), the average difference of the measured values, of support liners having bend height of 7.0 mm before the measurement and uniform thickness of 50 $\mu$m and identical areas, said characteristics being before or before/after characteristics. Without exception, the bends were produced not thermally but mechanically. The means for measuring the initial height "a" from the support surface F to the highest film bend (cf. diagram in FIG. 1) consisted of a balance-like apparatus on which the weights were placed and the deflections were measured with an accuracy of 0.1 mm. the response limit for applied loads was 1 pond (1 cN).

The graph of FIG. 2 shows the before spring characteristics of the following liners
VA1 Polyethylene terephthalate (PETP) liner having 1 central longitudinal bend
VA2 PETP liner having 2 parallel longitudinal bends 1.5 cm apart
VA3 PETP liner having 1 central longitudinal bend and 2 transverse bends symmetrical with respect to the central transverse axis and 3 cm apart.

After exposure to heat, all PETP liners were virtually completely flat and no spring deflection under load was any longer present or measurable. This radical change in the properties of the liner material, which is caused by freezing of the molecular chains of the plastic, even occurs on exposure to heat for less than 8 hours and begins roughly on reaching the glass transition temperature of PETP, at TG~70° C.

The graph of FIG. 2 was plotted to demonstrate the prior art, in order to show how the conventional support liners present in virtually all compact cassettes on the market today behave under the action of heat. They are without exception ineffective as support liners in the sense the spring forces can be exerted. The graph of FIG. 3 shows the before/after spring characteristics of the following liners
VB1 Polycarbonate support liner having 1 central longitudinal bend
NB1
VB2 Polycarbonate support liner having 2 parallel longitudinal bends 1.5 cm apart
NB1
VB3 Polycarbonate support liner having 1 central longitudinal bend and 2 transverse bends symmetrically with respect to the central transverse axis and 3 cm apart
NB3

The letter V denotes the curves before exposure to heat and the letter N denotes the curves after exposure to heat.

The maximum value of $\Delta f_{Vn}/\Delta f_V$ is 1.5, The graph of FIG. 4 shows the before/after spring characteristics of the following liners:

VC1 Polysulfone support liner having 1 central longitudinal bend

NC1

VC2 Polysulfone support liner having 2 parallel longitudinal bends symmetrically with respect to the central longitudinal axis and 1.5 cm apart

NC2

VC3 Polysulfone support liner having 1 central longitudinal bend and 2 transverse bends symmetrically with respect to the central transverse axis and 3 cm apart

NC3

In the graph of FIG. 4, the maximum value of $\Delta f_N/\Delta f_V$ is 1.60.

The start of the applied force range was chosen as 1.5 pond to take into account the minimum response force of 1 pond but nevertheless to obtain reliable measurements.

In the Experiments it has been taken into account that in compact cassettes the liners are to exert a load on the tape rolls in operation or in non-operation and undergo corresponding deflections. In Graphs the graphs of FIGS. 2 to 4 the range of the load has been chosen from 1.5 to 3.6 p, for the following reasons:

In the compact cassette, an internal height of about 0.6 mm is available for each support liner, and the liner can display its spring properties in this height. On average, the novel liners of the present invention are to 1.5 p to about 2.5 p, preferably about 2 p, on the tape rolls.

At the upper end of this range the forces in the Experiments have been increased, for the sake of safety in function of the cassettes, to up to 3.6 p.

In order to avoid any changes in the spring characteristic of the liners which have been exposed to an 8-hour-heating test extraordinary liners have to be used. Their ideal fraction $\Delta f_N/\Delta f_V$ is 1.0, which means that no difference occurs in the deflections. For eliminating the influence of the momentary load to be exerted on the liner the quotient of the fraction $\Delta f_N/\Delta f_V$ and the load K has to be calculated.

The values of the fraction $\Delta f_N/\Delta f_V$ and the load K have been taken from the graphs of FIGS. 3 and 4 in which the central bend-liner VB1 and NB1 of FIG. 3 is to be compared with the corresponding central bend-liner VC1 and NC1 of FIG. 4 and equally VB3 and NB3 of FIG. 3 with VC3 and NC3 of FIG. 4 (cf. the following tables).

| one central longitudinal bend | | | | | |
|---|---|---|---|---|---|
| VB1/NB1 | | | VC1/NC1 | | |
| $\Delta f_{N1}/\Delta f_{V1}$ | K/p | Q/1/p | $\Delta f_{N1}/\Delta f_{V1}$ | K/p | Q/1/p |
| 1,3 | 1,5 | 0,54 | 0,92 | 1,5 | 0,62 |
| 1,22 | 1,77 | 0,69 | 1,0 | 1,77 | 0,56 |
| 1,08 | 2,3 | 0,47 | 0,91 | 2,3 | 0,40 |
| 1,3 | 2,95 | 0,44 | 0,88 | 2,95 | 0,28 |
| 1 | 3,6 | 0,27 | 0,78 | 3,6 | 0,22 |
| $0,69/p \leq Q \leq 0,27/p$ | | | $0,62/p \leq Q \leq 0,22/p$ | | |

| two parallel central longitudinal bends | | | | | |
|---|---|---|---|---|---|
| VB2/NB2 | | | VC2/NC2 | | |
| $\Delta f_{N2}/\Delta f_{V2}$ | K/p | Q/1/p | $\Delta f_{N2}/\Delta f_{V2}$ | K/p | Q/1/p |
| 1,06 | 1,5 | 0,71 | 1,00 | 1,5 | 0,67 |
| 1,0 | 1,77 | 0,56 | 0,93 | 1,77 | 0,53 |
| 0,95 | 2,3 | 0,41 | 0,94 | 2,3 | 0,41 |
| 0,94 | 2,95 | 0,32 | 0,97 | 2,95 | 0,33 |
| 0,85 | 3,6 | 0,24 | 0,89 | 3,6 | 0,25 |
| $0,71/p \leq Q \leq 0,24/p$ | | | $0,67/p \leq Q \leq 0,25/p$ | | |

| one central longitudinal bend plus two transverse bends | | | | | |
|---|---|---|---|---|---|
| VB3/NB3 | | | VC3/NC3 | | |
| $\Delta f_{N3}/\Delta f_{V3}$ | K/p | Q/1/p | $\Delta f_{N3}/\Delta f_{V3}$ | K/p | Q/1/p |
| 1,43 | 1,5 | 0,95 | 1,6 | 1,5 | 1,05 |
| 1,5 | 1,77 | 0,85 | 1,28 | 1,77 | 0,72 |
| 1,45 | 2,3 | 0,63 | 1,06 | 2,3 | 0,46 |
| 1,3 | 2,95 | 0,44 | 0,96 | 2,95 | 0,33 |
| 1,38 | 3,6 | 0,38 | 0,88 | 3,6 | 0,24 |
| $0,95/p \leq Q \leq 0,38/p$ | | | $1,06/p \leq Q \leq 0,24/p$ | | |

In the graphs of FIGS. 3 and 4 and the above tables the letter B stands for a polycarbonate film, which is usually used for electrical insulation purposes and has a glass transition temperature of TG=150° C. (Makrofol of Bayer AG) and the letter C stands for polysulfone film, which is recommended for the same use as well as for any other thermal insulation purposes and has a glass transition temperature of TG=180° C. (Ultrason S from BASF AG).

Taking into account that these two films are completely different from one another, according to the present invention they have been transferred to a foreign field as guide liners for compact cassettes. Such guide liners are to be provided with bends by cold forming.

As is shown by the graphs of FIGS. 3 and 4 and the above tables, the quotients Q of each pair of liners are very well matched to each other. Moreover, all the quotients lie in the same range: $1.2 \leq 0 \leq 0.2$, where $$Q = \frac{\Delta f_N}{\Delta f_v} : K(p)$$

which is a very good range for dimensioning liners for thermally exposed compact cassettes.

According to the present invention a measure is provided by which a high temperature liner material can be selected from a great number of materials for the application in compact cassettes which must be exposed to high and long term temperature conditions, which could occur for example in automobiles, and under optimized specific spring characteristics applicable in any and all operating positions of compact cassettes.

In addition to the stated film materials which are also suitable for use in compact cassettes because the said materials are transparent, all other film materials having a glass transition temperature $TG \geq 85°$ C. can be used according to the invention.

The novel liners are provided with the above-mentioned bends in order to provide the necessary guidance and support for the tape and the tape roll in the cassette and, by reducing the contact areas, to improve the friction properties (by reducing and keeping constant the frictional forces and forces due to electrostatic charge). Through the use of the novel liners, expensive tape guidance means, such as guide levers, etc. can be dispensed with.

In the compact cassette, an internal height of about 0.6 mm is available for each support liner, and the liner can display its spring properties in this height. On average, the novel liners exert forces of from about 1.5 p to about 2.5 p, preferably about 2 p, on the tape rolls. Forces of this magnitude are sufficient for proper functioning of the cassette in the record/playback and rewind modes. According to the invention, it is now ensured that, even in the case of long-term exposure of the cassettes and/or liners to heat, the spring characteristics are essentially retained after exposure to heat, with slightly larger deflections after exposure to heat, in a range less than or equal to twice the deflections before exposure to heat.

A compact cassette is produced with substantially rectangular plastic support liner(s) between tape roll(s) and cassette wall(s), having at least one longitudinal bend, and the deflections of the support liners in a defined load range should be not more than a factor of 2 greater in the case of exposure to heat at 85° C. compared with no exposure to heat. Film materials having glass transition temperatures equal to or greater than 85° C. may be used, for example films of polysulfone, polyethersulfone, polycarbonate, polyarylether ketones, polyetherimide and/or blends and/or copolymers thereof.

We claim:

1. A compact cassette having a central axis, tape rolls and two substantially rectangular plastic support liners arranged above and below the tape rolls and substantially covering the tape rolls and each of which liners has at least one longitudinal bend for elastic side support of the tape rolls, the liners consisting of a plastic material selected from the group consisting of a polysulfone, a polyethersulfone, a copolymer of a polysulfone, a copolymer of a polyethersulfone, a polyetherimide, a polyaryletherketone, and a blend of polysulfone and a polyethersulfone, having a glass transition temperature of $TG \geq 80°$ C. and being exposed to a load in the range of about 1.5 to about 3.6 p, each of the liners having the following temperature dependent elastic characteristics:

a first deflection $\Delta f_V$ measured under a specific load value in the above load range before the liner has been exposed to a temperature of about 85° C. and
a second deflection $\Delta f_N$ measured under the above specific load value after the liner has been exposed to said temperature of about 85° C.
the quotient of the second and first deflections $\Delta f_N/\Delta f_V$ divided by said specific load value being in the range between 1.2/p and 0.2/p.

2. A compact cassette as claimed in claim 1, wherein the liner consists of a polysulfone.

3. A compact cassette as claimed in claim 1, wherein the liner consists of a polyethersulfone.

4. A compact cassette as claimed in claim 1, wherein the liner consists of a blend of a polysulfone and a polyethersulfone.

5. A compact cassette as claimed in claim 1, wherein the liner consists of a copolymer of a polysulfone or of a copolymer of polyethersulfone.

6. A compact cassette as claimed in claim 1, wherein the liner consists of a polyetherimide.

7. A compact cassette as claimed in claim 1, wherein the liner consists of a polyarylether ketone.

8. In a plastic support liner for a compact cassette having tape rolls, which support liner has at least one longitudinal bend for the elastic support of the tape rolls, the improvement comprising: the liner consisting of a plastic material selected from the group consisting of a polysulfone, a polyethersulfone, a copolymer of a polysulfone, a copolymer of a polyethersulfone, a polyetherimide, a polyaryletherketone, and a blend of polysulfone and a polyethersulfone, having a glass transition temperature of $TG \geq 85°$ C. and being exposed to a load in the range of about 1.5 to about 3.6 p, the liner having the following temperature dependent elastic characteristics: a first deflection $\Delta f_V$ measured under a specific load value in the above load range before the liner has been exposed to a temperature of about 85° C. and a second deflection $\Delta f_N$ measured under the above specific load value after the liner has been exposed to said temperature of about 85° C.,
the quotient of the second and first deflections $\Delta f_N/\Delta f_V$ divided by said specific load value being in the range between 1.2/p and 0.2/p.

9. A liner as claimed in claim 8, wherein the liner has a central longitudinal bend and two transverse bends.

10. A liner as claimed in claim 8, wherein the liner consists essentially of a polysulfone.

11. A liner as claimed in claim 8, wherein the liner consists essentially of a polyethersulfone.

12. A liner as claimed in claim 8, wherein the liner consists essentially of a blend of a polysulfone and a polyethersulfone.

13. A liner as claimed in claim 8, wherein the liner consists essentially of a copolymer of a copolymer of polysulfone or of a polyethersulfone.

* * * * *